UNITED STATES PATENT OFFICE.

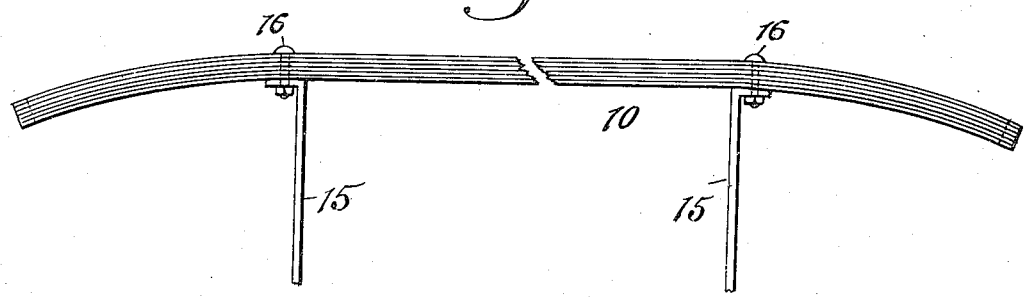
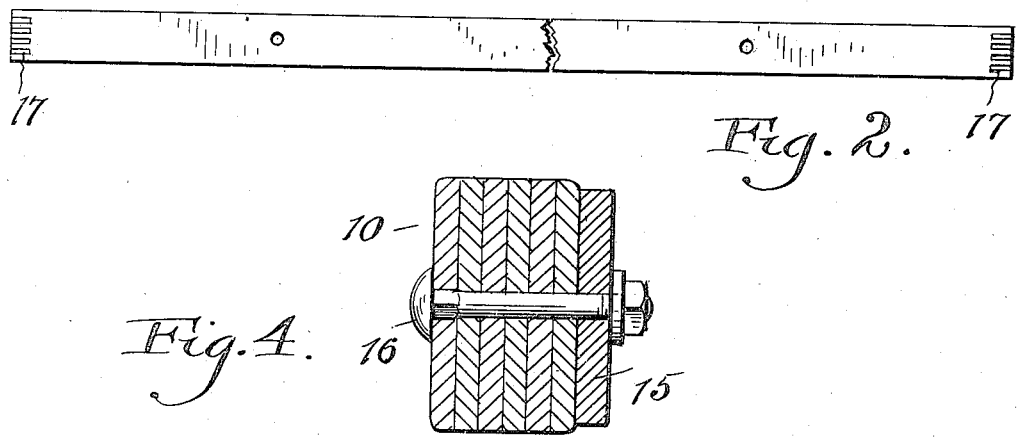
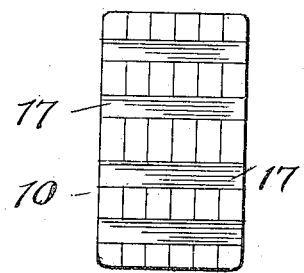

ELVERTON W. WEAVER, OF CLEVELAND HEIGHTS, OHIO.

RESILIENT BUMPER-BAR.

1,380,615.

Specification of Letters Patent.   Patented June 7, 1921.

Application filed September 9, 1920.   Serial No. 409,154.

*To all whom it may concern:*

Be it known that I, ELVERTON W. WEAVER, a citizen of the United States, residing at Cleveland Heights, in the county of Cuyahoga and State of Ohio, have invented a certain new and useful Improvement in Resilient Bumper-Bars, of which the following is a full, clear, and exact description.

The object of this invention is to provide a cheap, light weight, resilient bumper for automobiles.

The invention includes a laminated wooden bumper bar having the characteristics of construction shown in the drawings and hereinafter described and pointed out definitely in the appended claims.

In the drawings, Figure 1 is a plan view of a bumper bar embodying the invention; Fig. 2 is a front elevation thereof; Fig. 3 is a view of one end of the bumper; and Fig. 4 is a transverse vertical sectional view through the bumper bar and the bent over end of the bracket 15 which is attached to it.

The bumper bar 10 has both its ends bent slightly in the same direction, which will be rearward if the bar is used at the front of the motor car, or forward if used at the rear. The bar is made of laminated wood, the several laminæ extending from one end of the bar to the other, and the said laminæ are so disposed that when glued together the glued joints are substantially vertical.

In constructing this bar the several laminæ 12 are bent into the shape they are to occupy in the completed bar; and they are glued together when in this shape by means of suitable waterproof glue. The resulting bar, sufficiently strong for the intended purpose, will be much lighter than the metal bumper bars in common use. It will likewise be sufficiently resilient for the intended use. If this bar be bent by running into anything it will not remain permanently out of shape, but will resume its shape immediately after the bending stress is withdrawn.

The described bar may be secured to an automobile by means of properly shaped metal brackets 15. The bar is secured to these brackets by bolts 16 that pass horizontally through the bar and consequently through the several laminæ thereof. This manner of connecting the bar with the brackets imparts to the structure a very desirable characteristic, to wit, that if by accident the bar gets tangled up in the running gear or other parts of another car the bar can readily be detached from the brackets.

In order to minimize the chances that when the ends of the bar, by accident, strike something or other, the various laminæ will be pulled apart, reinforcing wood strips 17 are inset into the ends of the bar, being forced in the horizontal slots or kerfs and being glued therein to the several laminæ.

Having described my invention, I claim:

1. A resilient bumper bar for automobiles comprising a plurality of bent laminæ glued together with the joints between them occupying substantially vertical positions, the bar having curved ends.

2. A resilient bumper bar for automobiles comprising a plurality of bent laminæ glued together with the joints between them occupying substantially vertical positions, the bar having curved ends, and reinforcing wood strips inset in horizontal positions in the ends of said bumper bar and glued to the several laminæ thereof.

3. A resilient bumper bar for automobiles comprising a plurality of bent laminæ glued together with the joints between them occupying substantially vertical positions, brackets for securing said bumper bar to an automobile, each bracket being secured against the inner face of the bumper bar, and bolts passing through said bumper bar from front to rear and through said brackets.

In testimony whereof, I hereunto affix my signature.

ELVERTON W. WEAVER.